United States Patent [19]

Uschold

[11] Patent Number: 4,513,128
[45] Date of Patent: Apr. 23, 1985

[54] FLUORINATED VINYL ETHER COPOLYMERS HAVING LOW GLASS TRANSITION TEMPERATURES

[75] Inventor: Ronald E. Uschold, West Chester, Pa.

[73] Assignee: E. I. Du Pont de Nemours and Company, Wilmington, Del.

[21] Appl. No.: 507,083

[22] Filed: Jun. 23, 1983

[51] Int. Cl.³ ............... C08F 214/18; C08F 214/24; C08F 214/26
[52] U.S. Cl. ................................ 526/212; 526/246; 526/247
[58] Field of Search ............... 526/212, 247, 246

[56] References Cited

U.S. PATENT DOCUMENTS

| | | | |
|---|---|---|---|
| 3,132,123 | 5/1964 | Harris et al. | 260/87.5 |
| 3,291,843 | 12/1966 | Fritz et al. | 260/614 |
| 3,310,606 | 3/1967 | Fritz | 260/234 |
| 3,322,826 | 5/1967 | Moore | 260/544 |
| 3,326,984 | 6/1967 | Anderson et al. | 260/614 |
| 3,397,191 | 8/1968 | Beckerbauer | 260/80.3 |
| 3,450,684 | 6/1969 | Darby | 260/87.5 |
| 3,467,638 | 9/1969 | Pattison | 260/87.5 |
| 3,817,960 | 6/1974 | Resnick | 260/87.5 |
| 4,078,135 | 3/1978 | Sulzbach et al. | 526/247 |
| 4,116,888 | 9/1978 | Ukihashi et al. | 526/247 |
| 4,138,426 | 2/1979 | England | 260/465.6 |
| 4,281,092 | 7/1981 | Breazeale | 526/247 |
| 4,330,654 | 5/1982 | Ezzell et al. | 526/243 |
| 4,368,308 | 1/1983 | Yamabe et al. | 526/427 |
| 4,418,186 | 11/1983 | Yamabe et al. | 526/247 |

FOREIGN PATENT DOCUMENTS

| | | |
|---|---|---|
| 0041737 | 12/1981 | European Pat. Off. . |
| 0055407 | 7/1982 | European Pat. Off. . |
| 0077998 | 5/1983 | European Pat. Off. . |
| 0093404 | 11/1983 | European Pat. Off. . |

OTHER PUBLICATIONS

Kalb et al., Advances in Chemistry Series 129, American Chemical Society, 1973, p. 13.
Hill, J. Macromol. Sci.–Chem., A8(3), 499–520, (1974).
Barney et al., J. Poly. Sci., A–1, 8, 1091–1098, (1970).

Primary Examiner—Harry Wong, Jr.

[57] ABSTRACT

Substantially amorphous fluorine-containing perhalogenated copolymer having a glass transition temperature of $-15°$ C. to $-100°$ C. and consisting essentially of structural units having a fluorocarbon or chlorocarbon backbone and perfluorinated polyether side chains.

10 Claims, 2 Drawing Figures

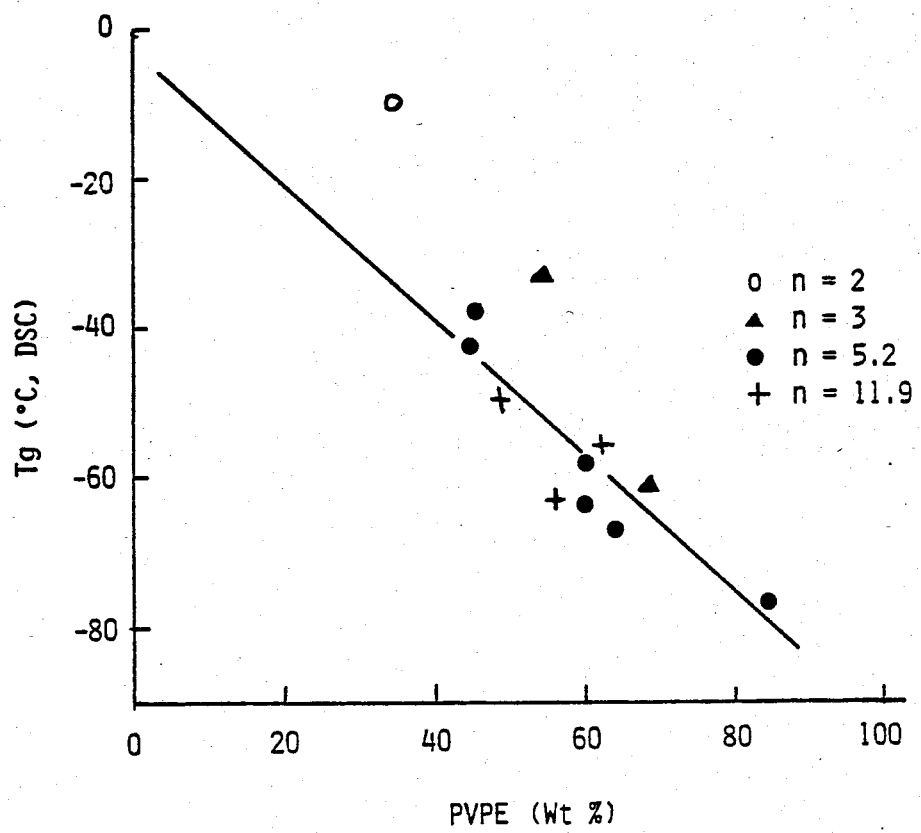

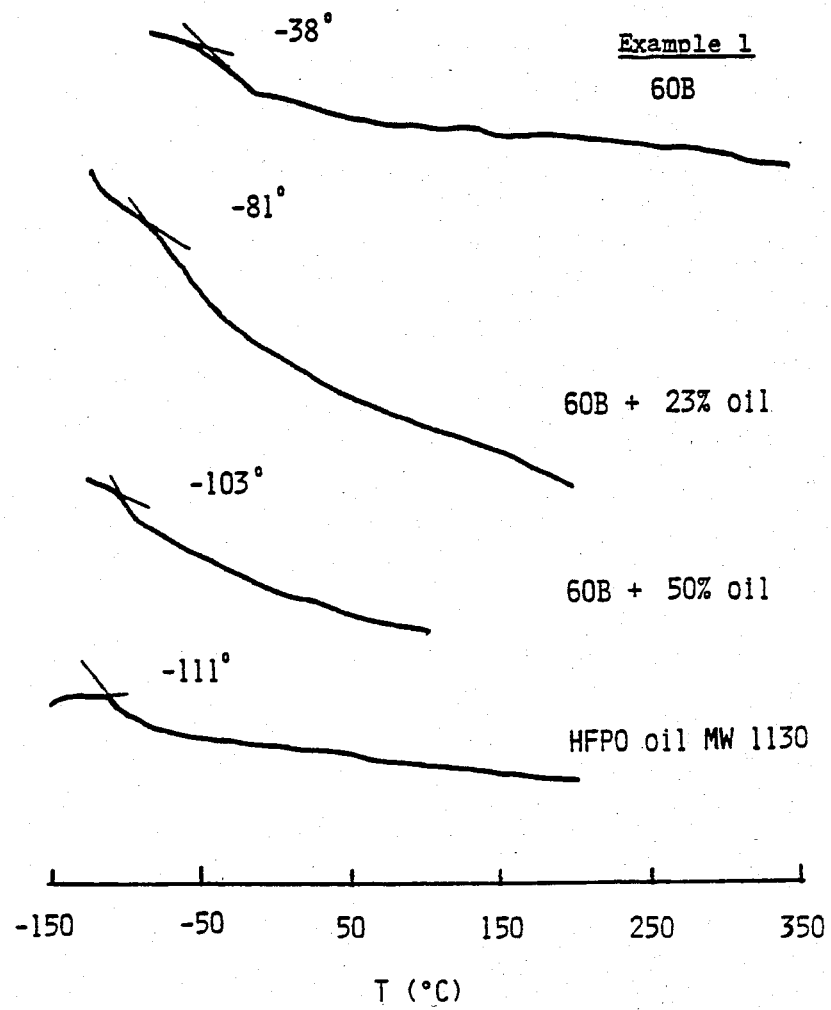

FLUORINATED VINYL ETHER COPOLYMERS HAVING LOW GLASS TRANSITION TEMPERATURES

BACKGROUND OF THE INVENTION

1. Field of the Invention

This invention relates to substantially amorphous fluorinated vinyl ether copolymers having low glass transition temperatures.

2. Background

Known elastomeric copolymers of tetrafluoroethylene (TFE) and perfluoromethylvinyl ether (PMVE) are useful because of their high temperature and chemical resistances. These copolymers are usually crosslinked (cured) to a three-dimensional network so that they resist permanent deformation in use. Curesite monomers are incorporated into the TFE/PMVE polymers in low concentrations (1–4%). Although these polymers are useful at very high temperatures, their usefulness at low temperatures is limited by the glass transition temperature, Tg, of the polymer. When the environmental temperature drops below the Tg, the polymer becomes stiff or brittle and non-elastomeric. The Tg of TFE/PMVE polymers is relatively insensitive to polymer composition, varying only from $-10°$ C. to $-15°$ C. when the PMVE content of the polymer ranges from 20 mole % to about 50 mole %. Because of its low concentration, the curesite monomer has practically no effect on Tg; hence, the usefulness of TFE/PMVE polymers is limited to temperatures above about $-15°$ C. One means of obtaining better low temperature properties is to prepare a polymer for example, a polyether, having a more flexible backbone. Polyhexafluoropropylene oxide (poly-HFPO) has a Tg of $-50°$ C. to $-60°$ C. and retains its elastic properties at these temperatures.

Specific publications which provide useful background information for the invention herein are discussed below.

U.S. Pat. No. 3,132,123 discloses perfluoroalkylvinyl ethers of the formula $CF_2=CF-OR$ wherein R is perfluoroalkyl. U.S. Pat. No. 3,291,843 discloses a process for preparing fluorinated vinyl ethers which can be represented by the formula $CF_2=CF(OCF_2CFR)_nOR_f$ wherein R is F or $CF_3$, $R_f$ is perfluoroalkyl of 1 to 12 carbon atoms and n is an integer and is 1 to 20. Copolymers of the vinyl ether and tetrafluoroethylene are also disclosed. U.S. Pat. No. 3,322,826 discloses perfluorinated acid fluorides of the formula $C_3F_7O[CF(CF_3)CF_2O]_nCF(CF_3)COF$ wherein n is 0 to about 23, prepared by polymerizing HFPO, and that the acid fluorides can be converted to vinyl ethers which can be homopolymerized or copolymerized. U.S. Pat. No. 3,817,960 discloses polymers and tetrafluoroethylene copolymers of perfluorovinyl ethers of the formula $CF_3O(CF_2O)_nCF_2CF_2OCF=CF_2$ wherein n is 1 to 5. U.S. Pat. No. 3,450,684 discloses homopolymers and copolymers of fluorocarbon polyethers of the formula $XCF_2CF_2(OCFXCF_2)_nOCF=CF_2$ wherein X is F, Cl or H and n is an integer and is at least 1. U.S. Pat. No. 4,138,426 discloses homopolymers and copolymers of functionally substituted fluorocarbon polyethers of the formula $YCF_2CF_2O[CF(CF_3)CF_2O]_pCF=CF_2$ wherein Y is COOR, COOH, COOM or CN, p is 1 to 5 and M is alkali metal, ammonium or quaternary ammonium. U.S. Pat. No. 4,330,654 discloses copolymers of functionally substituted fluorinated vinyl ethers which include those of the formula $Y(CF_2)_a(CFR_f)_b(CFR_f)_cO[CF(CF_2X)CF_2O]_nCF=CF_2$ wherein a and b are 0 or an integer greater than 0, c is 0 or 1, the sum of a, b and c is not 0, n is 0 or an integer greater than 0, X is F, Cl or Br and $R_f$ is F, Cl, perfluoroalkyl or chlorofluoroalkyl. A similar disclosure appears in European Patent Application Publication No. 0 041 737. U.S. Pat. No. 4,281,092 discloses elastomeric copolymers of tetrafluoroethylene, a perfluoroalkylvinyl ether and, as a curesite monomer, a functionally substituted fluorovinyl ether of the formula $CF_2=CF[OCF_2CF(CF_3)]_xO(CF_2)_nCN$ wherein n is 1 to 4 and x is 1 to 2. U.S. Pat. No. 3,467,638 discloses elastomeric curable copolymers of vinyl monomers and monomers of the formula $C_6F_5O[CF(CF_3)CF_2O]_nCF=CF_2$ wherein n is 0, 1 or 2.

Kalb et al., *Advances in Chemistry Series* 129, American Chemical Society, 1973, page 13, disclose elastomeric copolymers of tetrafluoroethylene, perfluoro(methylvinyl ether) (PMVE) and, as a curesite monomer, a vinyl ether of the formula $CF_2=CFOR_fX$ wherein $R_f$ is perfluoroalkylene, optionally containing ether oxygen atoms, and X is CN, COOR or $OC_6H_5$. The copolymers typically contain about 40% polymerized PMVE and 1–4% of the polymerized curesite monomer. Preparative methods for the polymers include free radical-initiated solution and aqueous emulsion polymerizations, and the use of ammonium persulfate-sodium sulfite redox couple at $40°$–$100°$ C. to initiate emulsion polymerization is disclosed.

Hill, *J. Macromol. Sci.-Chem.*, A8(3), 499–529 (1974), discloses the homopolymerization of hexafluoropropylene oxide; the polymers so produced have multiple ether links in the backbone chain and exhibit glass transition temperatures (Tg) as low as $-60°$ C., with retention of flexibility. Also disclosed are reactions of the polymers, having acyl fluoride end groups, to produce chain extended and crosslinked polymers having thermal and chemical resistance.

Barney et al., *J. Poly. Sci.*, A-1, 8, 1091–1098 (1970), disclose the preparation and properties of elastomeric, curable fluorocarbon copolymers of tetrafluoroethylene and perfluoro(methyl vinyl ether), containing 20–50 mole % of the vinyl ether moiety. The glass transition temperatures of the copolymers are $-15°$ C. or higher and are relatively insensitive to the vinyl ether content. Also disclosed is the plasticization of the copolymers with compatible Krytox ® perfluoroalkylpolyether oils prepared from hexafluoropropylene oxide.

U.S. Pat. Nos. 3,310,606; 3,397,191; and 3,326,984 disclose, respectively, divinyl ether monomers of the formulas $CF_2=CFO(CF_2)_nOCF=CF_2$, $CF_2=CFO(CF_2CF_2O)_nCF=CF_2$ and $CF_2=CFO(CF_2)_mOCF=CF_2$, and $CF_2=CFOCF=CF_2$.

European Patent Application Publication No. 0 055 407 discloses fluorine-containing elastomers having low temperature and alcohol resistance, prepared, for example, by free radical emulsion polymerization using redox initiators, and comprised of at least 80 mole percent of polymer repeat units of vinylidene fluoride and a fluorovinyl ether of the formula $CF_2=CFOX$ wherein X is $C_3$–$C_9$ perfluoroalkyl having 1 to 3 oxygen atoms; up to 20 mole percent of polymer repeat units of hydrocarbon olefins or other fluoroolefins can be present. Cure sites can be introduced into the elastomers by using appropriate monomers such as perfluoro(2-bromoethylvinyl ether), and the elastomers exhibit glass transition temperatures as low as −38° C. U.S. Pat. No. 4,368,308 is similar in disclosure to the European patent application except that there must be at least 70 mole percent of ethylene and fluorovinyl ether repeat units, X is $C_1$-$C_9$ perfluoroalkyl having at least one oxygen atom, and a glass transition temperature of −46° C. is exemplified.

In general, the art, such as reflected above, suggests that fluorine-containing perhalogenated copolymers having ether links in side chains, rather than in the backbone chain, exhibit glass transition temperatures of about −15° C., below which temperature they lose their flexibility.

It is an object of this invention to provide fluorine-containing perhalogenated copolymers having ether links in the side chains, but not in the backbone chains. Another object is to provide such copolymers which exhibit glass transition temperatures less than −15° C., for example, −100° C. A still further object is to provide such copolymers which are flexible (elastomeric) and which retain their flexibility at temperatures below −15° C., for example, to −100° C. A further object is to provide such copolymers which not only exhibit good low temperature properties, but excellent high temperature properties and chemical inertness as well. Other objects will become apparent hereinafter.

BRIEF DESCRIPTION OF THE DRAWINGS

FIG. 1 shows a plot of glass transition temperature vs. weight percent perfluorovinylpolyether monomer repeat unit in the copolymer of the invention.

FIG. 2 shows differential scanning calorimetry plots which reflect the glass transition temperatures of the copolymer of the invention; a perfluorinated polyether oil; and the copolymer containing 23 or 50 wt. % oil.

DETAILED DESCRIPTION OF THE INVENTION

For further comprehension of the invention, and of the objects and advantages thereof, reference may be made to the following description and appended claims in which the various novel features of the invention are more particularly set forth.

This invention resides in fluorine-containing perhalogenated substantially amorphous copolymers having glass transition temperatures (Tg) in the range −100° C. to −15° C. and consisting essentially of the following repeating structural units, in the molar amounts shown, with the total of the amounts being 100%:

(a) about 50 to about 80% —$CF_2CX^1X^2$— wherein $X^1$ and $X^2$, independently, are F or Cl;

(b) 0 to about 50%, preferably 5 to 35%,

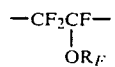

wherein $R_F$ is $C_1$-$C_5$ perfluoroalkyl;

(c) about 3 to about 50%, preferably 5 to 35%,

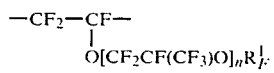

wherein $R_F^1$ is $C_1$-$C_{12}$ perfluoroalkyl, n is an integer and is 3 to 30, perferably 4 to 10; and (d) 0 to about 10%, preferably 2 to 5%,

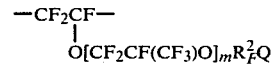

wherein $R_F^2$ is $C_1$-$C_{12}$ perfluoroalkylene or perfluorophenylene, Q is —$CO_2R$, —CN, —F, —Cl, —Br or —I, R is $C_1$-$C_4$ alkyl, and m is an integer and is 1, 2 or 3; with the proviso that (i) the total molar concentration of (b)+(c)+(d) is 20 to 50%, preferably 25 to 40%; (ii) the concentration of (c) is at least 20 weight %; and (iii) when $R_F^2$ is prefluoroalkylene, Q is —$CO_2R$, —CN, —Br or —I. Preferably, $R_F^2$ is perfluoroethylene, Q is —CN and m is 1 or $R_F^2$ is perfluorophenylene, Q is —F and m is 1. The weight % of (c) may be calculated using the formula $$\frac{yM_y}{wM_w + xM_x + yM_y + zM_z} > 20$$

wherein w, x, y and z are, respectively, the mole percentages of (a), (b), (c), and (d), and $M_w$, $M_x$, $M_y$ and $M_z$ are the respective molecular weights of these units. Preferably, (a) is —$CF_2CF_2$— and (b) is

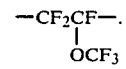

Preferred copolymers of this invention have Tg values in the range −80° C. to −25° C.

This invention also resides in an emulsion polymerization process for preparing the above-described copolymers, and in compositions comprising the copolymers admixed with about 5 to about 80%, by weight, of fluorinated polyether oils prepared by polymerizing hexafluoropropylene oxide (HFPO); such compositions exhibit Tg values as low as −105° C. More specifically, the process of the invention resides in the preparation of the above-described copolymers by means of an improved aqueous emulsion polymerization process comprising polymerizing appropriate monomers in an aqueous medium in the presence of a redox couple initiator and a surfactant at 20° C. to 90° C., the improvement consisting of polymerizing appropriate amounts of monomers of the formulas $CF_2{=}CX^1X^2$, $CF_2{=}CFOR_F$, $CF_2{=}CFO\!+\!CF_2CF(CF_3)O\!\rightarrow\!_nR_F^1$ and $CF_2{=}CF_2O\!+\!CF_2CF(CF_3)O\!\rightarrow\!_mR_F^2Q$ wherein $X^1$, $X^2$, $R_F$, $R_F^1$, $R_F^2$, Q, n and m are as defined hereinabove, in the presence of a fluorinated alcohol which is soluble in water and in the monomer of the formula $CF_2{=}CFO\!+\!CF_2CF(CF_3)O\!\rightarrow\!_nR_F^1$.

All of the monomers used to prepare the copolymers of this invention are known in the art.

As noted above, elastomeric (flexible) tetrafluoroethylene (TFE)/perfluoromethylvinyl ether (PMVE) copolymers of the art exhibit good high temperature and chemical resistances, but they lose their elastomeric properties, for example, at −10° C. to −15° C., their glass transition temperatures. The instant invention resides principally in the discovery that the elastomeric properties of TFE homopolymers and TFE/PMVE copolymers can be retained substantially below −15° C., for example, to −100° C., if such polymer or copolymer includes about 3 to about 50 mol % of polymer repeat units provided by the perfluorovinylpolyether (PVPE) monomer of the formula $CF_2=CFO[CF_2CF(CF_3)O]_nR_F^1$ wherein $R_F^1$ and n are as defined above and the total concentration of PVPE and other vinyl ether monomer units is about 20 to about 50 mole percent. This monomer, like the others, can be prepared using known techniques; it generally is prepared by pyrolysis of the corresponding acyl fluoride of the formula $FOCCF(CF_3)O[CF_2CF(CF_3)O]_nR_F^1$.

PVPE monomers can be analyzed by $^{19}F$ nuclear magnetic resonance spectroscopy (NMR) and by gas chromatography. By comparing the integrated signal values for the tertiary fluorine atoms in PVPE with those for the vinylic fluorine atoms or for the fluorine atoms in a perfluoroalkyl or perfluorophenyl end group, the value of n can be determined. When a mixture of PVPE monomers having different values of n is used, an average value of n is calculated and used in turn to calculate a number average molecular weight ($\overline{M}_n$) for the monomer mixture. The concentration of each monomeric constituent present in such a mixture can be determined by gas chromatography when $\overline{M}_n$ is below about 2000. For example, chromatographic results for a PVPE mixture wherein the average n is 5.2 and $\overline{M}_n$ is 1130 are shown below.

| Gas Chromatographic Analysis of PVPE | |
| --- | --- |
| n | % |
| 1 | 0.14 |
| 2 | 1.7 |
| 3 | 10.7 |
| 4 | 24.6 |
| 5 | 32.1 |
| 6 | 20.1 |
| 7 | 8.1 |
| 8 | 2.5 |

Analysis of a PVPE mixture wherein the average n is 10.9 and $\overline{M}_n$ is 2080 was unsuccessful because only components with n up to about 10 could be observed in the chromatogram. However, from the distribution of PVPE constituents having values of n up to about 10, the mixture wherein $\overline{M}_n$ is 2080 was estimated to contain constituents having values of n up to about 20.

It has been discovered that the ability of PVPE monomers to reduce copolymer Tg depends on their molecular size, especially the length of the polyether segments, which is determined by the value of n, and on their concentration, as repeat units, in the copolymer. When n is 0 to 2, very little effect on Tg is observed. For example, the Tg of a TFE/PMVE copolymer containing 9 mole % of a PVPE monomer wherein $R_F^1$ is $-C_3F_7$ and n is 2, is $-9°$ C., a value close to that observed in unmodified TFE/PMVE copolymers. In contrast, a TFE/PMVE copolymer containing 16 mole % of a PVPE monomer wherein n is 3 has a Tg of $-33°$ C. Although PVPE of small n can be separated by fractional distillation, such separation becomes increasingly difficult as n increases above 3. For this reason PVPE mixtures are used for the higher molecular weight monomers. A plot of copolymer Tg vs. weight % PVPE is shown in FIG. 1. The dependance of Tg on composition when n is 3 or higher is evident from the figure. It is also evident that incorporation of PVPE monomers having $n \geq 3$ into TFE/PMVE copolymers results in products having exceptionally low glass transition temperatures. The low-Tg copolymers of this invention contain at least 20 weight % of (c) units (from PVPE monomer), n in such units being at least 3.

To insure that the copolymers of the invention are substantially noncrystalline and elastomeric in addition to having a Tg below about $-15°$ C., the copolymers must contain 20 to 50 mole %, preferably at least 25 mole %, of (b)+(c)+(d). For practical applications it is generally desirable to cure (vulcanize or cross-link) the copolymers of the invention. Curability is introduced into the copolymers by means of a cure-site monomer, which provides (d) in the copolymer. The cure-site monomer is of the formula $CF_2=CFO[CF_2CF(CF_3)O]_mR_F^2Q$ wherein $R_F^2$, Q and m are as defined above. These monomers, which are known compounds, also contribute polyether side chains to the copolymers.

The copolymers of the invention can be prepared by conventional techniques using free radical-initiated polymerization in solution. Monomers and an initiator, such as perfluoropropionyl peroxide (3P), are dissolved in a suitable solvent, such as 1,1,2-trichloro-1,2,2-trifluoroethane, in which initiator, solvent and monomers are mutually compatible, yielding homogeneous solutions. A polymerization temperature in the range 0° C. to 100° C. is normally chosen to provide a convenient half life for the initiator; a polymerization temperature of 20° C. to 60° C. is suitable for 3P initiation.

The copolymers of the invention also can be prepared by aqueous emulsion polymerization, but it has been found, surprisingly, that it will proceed only when a fluorinated alcohol which is soluble in both water and PVPE is added to the aqueous phase of the polymerization mixture. Suitable alcohols include trifluoroethanol and hexafluoroisopropanol. Although the role of fluoroalcohol remains uncertain and although it is not intended to characterize the process by any particular mechanism, it is believed that the alcohol increases the solubility of the PVPE in the aqueous phase and facilitates transfer of the PVPE monomer from droplets suspended in the aqueous medium to the site of polymerization. Monomer droplets apparently decrease in size during polymerization; the emulsion which is milky white at the start of polymerization becomes translucent and in some cases transparent by the end of polymerization. The observed gradual clarification of the emulsion is consistent with decreasing droplet size, the final polymer particles and monomer droplets becoming small enough to reduce scattering of light incident on the emulsion. Such optical effects are facilitated by the close match in the index of refraction for water, polymer product and PVPE.

Emulsion polymerization also requires the presence of a surfactant, consistent with commonly used emulsion polymerization practice. Salts of perfluoroalkyl carboxylates, commonly employed as surfactants, such as ammonium perfluorooctanoate, are operable in the present process. However, improved surfactant behavior is obtained with perfluoroalkylether carboxylates, examples of which include $C_2F_5O(CF_2CF(CF_3)O)_m(CF_2)_2COONa$, wherein m is 3 or 4, and $C_3F_7O(CF_2CF(CF_3)O)_mCF(CF_3)COONa$, wherein m is 4.9 and represents the average of a mixture of m=1, 2, ..., 8. These surfactants provide more stable monomer and polymer emulsions and permit easier incorporation of larger amounts of PVPE into the polymer.

Emulsion stability in the present process has been found to depend on the relative amounts of surfactant and fluoroalcohol employed. Stability generally increases as the amount of alcohol and surfactant added to the aqueous phase increase. Workable ranges for these materials are, on a weight basis, about 1 to 10%, preferably 2 to 5%, for the surfactant, and 5 to 20%, preferably 10 to 15%, for the fluoroalcohol, based on the aqueous phase.

Emulsion stability also increases as pH of the aqueous phase increases up to a pH of 9 to 10, without further improvement at higher pH. Thus, a buffer, for example, disodium hydrogen phosphate, trisodium phosphate or ammonium carbonate, may conveniently be added to the aqueous phase to provide an initial pH of at least 7, preferably about 9 to 10.

Emulsion polymerization can be initiated, for example, by means of an ammonium persulfate-sodium sulfite redox couple at a temperature of about 20° C. to 90° C., preferably 50° C. to 70° C.

The copolymers of this invention have been found to be surprisingly miscible with commercially-available perfluoroalkylpolyether oils, such as Krytox® 143 fluorinated oils. These oils, derived from HFPO, plasticize the copolymers to yield compositions having glass transition temperatures substantially below that of the copolymers. Conventional TFE/PMVE copolymers are reportedly compatible with perfluoroalkylpolyether oils, but very little oil is absorbed by the polymer and little, if any, plasticization is observed. The copolymers of this invention, in contrast, are miscible with more than their own weight of perfluoroalkylpolyether oils and very substantive decreases in Tg are observed with the resulting mixtures. Compositions may contain up to about 70 weight % of polyether oil.

In the following examples, percentages are by weight and temperatures are in degrees Celsius unless otherwise indicated.

EXAMPLE 1

Copolymers of TFE/PMVE/PVPE Prepared by Solution Polymerization

Perfluorovinylpolyether (PVPE) of formula $CF_2=CFO[CF_2CF(CF_3)O]_nCF_2CF_2CF_3$ was weighed into a heavy walled 20 mL polymer tube. The tube was attached to a vacuum line and the PVPE was degassed by freezing under vacuum in liquid nitrogen. The desired amounts of TFE and PMVE were measured volumetrically into the vacuum line and then condensed into the polymer tube. Perfluoropropionyl peroxide in a stock solution of Freon® TF (1,1,2-trichloro-1,2,2-trifluoroethane), stored at 0°, was added by means of a syringe to the polymer tube through a heavy walled rubber coupling connecting the polymer tube to the vacuum line. The tube was sealed and allowed to warm. When the tube warmed to about 0°, it was placed on a shaker and the polymerization was allowed to proceed at room temperature for the desired length of time.

Alternatively, the PVPE, Freon® TF and 3P were added to a 75 mL stainless steel bomb. The bomb and its contents were cooled in an acetone/dry ice bath and alternately evacuated and filled with nitrogen three times to deoxygenate the bomb contents. The desired amounts of TFE and PMVE were then metered into the bomb which was then placed on a thermostated shaker at 60°.

In each case polymer was isolated by evaporating Freon® TF and some unconverted monomer under vacuum at 100°. Polymers with high PVPE content were soluble in the residual monomer/Freon® TF mixture but not in pure Freon® TF. The final portions of monomer were removed from the polymer by extraction with 3 portions of Freon® TF. The polymer was then dried to constant weight in a vacuum oven at 110°–120°.

The quantities of material charged in each case and the results obtained are reported in Table 1 for several polymerizations. Polymers were analyzed by $^{19}F$ NMR to determine composition. Solutions of the polymers in 2,2,4,4-tetrakis(trifluoromethyl)-1,3-dithiatane containing Freon® 11 as an internal reference were used for this purpose. Glass transition temperatures were determined by differential scanning calorimetry (DSC) and the values reported are the average of one heating and one or two reheats of a given sample.

TABLE 1

| Run | 60B | 63B | 66C | 68B | 69A | 69B | 73A | 73B | 149D | 150B | 150C | 150D |
|---|---|---|---|---|---|---|---|---|---|---|---|---|
| Freon TF (mL) | 10 | 10 | 10 | 10 | 10 | 10 | 5 | 5 | 5 | 5 | 3 | 3 |
| PVPE (g) | 9 | 9 | 15 | 20 | 9 | 9 | 18 | 15 | 9 | 8.1 | 7.6 | 15.6 |
| n | 5.2 | 5.2 | 5.2 | 5.2 | 5.2 | 5.2 | 10.9 | 10.9 | 5.8 | 2.0 | 3.0 | 3.0 |
| PMVE (g) | 4 | 6 | 4 | — | 4 | 1.3 | 4 | 2 | 4 | 3 | 2.8 | 2.3 |
| TFE (g) | 1.5 | 4 | 1.5 | 9.75 | 0.8 | 0.8 | 1.5 | 1.0 | 1.55 | 1.55 | 1.57 | 1.57 |
| 3P (g) | 0.05 | 0.05 | 0.05 | 0.05 | 0.05 | 0.05 | 0.025 | 0.025 | 0.025 | 0.025 | 0.015 | 0.015 |
| (1) (g) | | | | | | | | | 1.0 | | | |
| Conditions (°C./h) | 60/3 | 60/3 | 25/24 | 25/72 | 25/18 | 25/18 | 25/20 | 25/20 | 48/25 | 70/25 | 96/25 | 96/25 |
| Monomer Conversion (%) | | | | | | | | | | | | |
| PVPE | 8.7 | 14 | 8.0 | 5.5 | 4.8 | 14 | 2.8 | 3.5 | 9.4 | 2.0 | 20 | 19 |
| PMVE | 5.1 | 10 | 5.0 | — | 3.1 | 5.4 | 2.5 | 5.6 | 4.4 | 2.0 | 16 | 9.3 |
| TFE | 48 | 23 | 40 | 28 | 21 | 73 | 14 | 30 | 32 | 15 | 48 | 68 |
| (1) | — | — | — | — | — | — | — | — | 8.0 | — | — | — |
| Polymer wt (g) | 1.7 | 2.8 | 2.0 | 1.3 | 0.72 | 2.0 | 0.83 | 0.94 | 1.6 | 0.46 | 2.7 | 4.3 |
| Mole % | | | | | | | | | | | | |
| PVPE | 8 | 8 | 13 | 32 | 13 | 14 | 8 | 6.5 | 10 | 9 | 16 | 25 |
| PMVE | 13 | 26 | 15 | — | 27 | 12 | 20 | 18 | 15 | 12 | 23 | 8 |
| TFE | 79 | 66 | 72 | 68 | 60 | 74 | 72 | 76 | 72 | 78 | 61 | 67 |
| (1) | — | — | — | — | — | — | — | — | 3 | — | — | — |
| Tg (°C.) | −38 | −43 | −64 | −76 | −55 | −67 | −56 | −63 | −41 | −9 | −33 | −61 |

(1): $CF_2=CFOCF_2CF(CF_3)OCF_2CF_2CN$

EXAMPLE 2

TFE/PMVE/PVPE Copolymers by Emulsion Polymerization

Water, disodium phosphate heptahydrate and surfactant were mixed together in the amounts (in grams) given in Table 2 and stirred until dissolved. PVPE and hexafluoroisopropanol (HFIP) were then added and the mixture was vigorously shaken to emulsify the PVPE. In some cases the mixture was emulsified with a high speed homogenizer, but benefits derived from this are uncertain. The resulting emulsion, sodium sulfite and ammonium persulfate were added to a 400 mL stainless steel shaker tube. The tube was cooled in ice water and its contents were deoxygenated by alternately evacuating the tube and filling it with nitrogen three times. The tube was then charged with the desired amount of TFE and PMVE, placed on a shaker and shaken at the time and temperature noted below. Polymer was isolated by acidifying the resulting dispersion, extracting the precipitate with Freon ® TF (1,1,2-trichloro-1,2,2-trifluoroethane) three times and then washing with quantities of water until the surfactant was removed. The polymer was then dried to constant weight in a vacuum oven at 110°–120°. Polymer samples were analyzed as described in Example 1. Results are shown in Table 2.

TABLE 2

| Run | 76 | 79 | 84B | 84C | 84D | 88A | 88B | 88C |
|---|---|---|---|---|---|---|---|---|
| Water (mL) | 100 | 100 | 100 | 100 | 100 | 100 | 200 | 100 |
| Na$_2$HPO$_4$.7H$_2$O (g) | 2.5 | 2.5 | 2.5 | 2.5 | 2.5 | 2.5 | 2.5 | 2.5 |
| PVPE$^e$ (g) | 15 | 15 | 15 | 15 | 15 | 30 | 30 | 27 |
| Surfactant (g) | 5$^a$ | 5$^b$ | 5$^c$ | 5$^a$ | 5$^d$ | 5$^a$ | 2$^a$ | 5$^d$ |
| HFIP (g) | 15 | 15 | 15 | 15 | 15 | 15 | 30 | 15 |
| Na$_2$SO$_3$ (g) | 0.2 | 0.2 | 1.1 | 1.1 | 1.1 | 0.5 | 0.25 | 0.5 |
| APS (g) | 0.9 | 0.9 | 2.0 | 2.0 | 2.0 | 1.0 | 0.50 | 1.0 |
| TFE (g) | 5 | 8 | 5 | 5 | 5 | 10 | 10 | 5 |
| PMVE (g) | 10 | 16 | 10 | 10 | 10 | 20 | 20 | 10 |
| Conditions (°C./h) | 60/3 | 60/3 | 60/3 | 60/8 | 60/8 | 60/8 | 60/12 | 60/12 |
| Conversion % | | | | | | | | |
| PMVE | 6.7 | 3.7 | 13 | 8 | — | 5.5 | 1.0 | 6.4 |
| PVPB | 19 | 10 | 17 | 24 | — | 11.5 | 1.1 | 10 |
| TFE | 24 | 13 | 24 | 22 | — | 23 | 6.6 | 60 |
| Polymer | 4.8 | 3.1 | 5.0 | 5.9 | — | 6.9 | 0.85 | 4.6 |
| Mole % | | | | | | | | |
| PMVE | 22 | 23 | 35 | 33 | 29 | 20 | 25 | 21 |
| PVPE | 14 | 9 | 10 | 15 | 19 | 9 | 6.2 | 14 |
| TFE | 64 | 68 | 55 | 52 | 52 | 71 | 68 | 65 |
| Tg (°C.) | −46 | −41 | −36 | −42 | −49 | −43 | −44 | −45 |
| $\eta_{inh}$ | 0.35 | 0.52 | | | | | | |

$^a$C$_2$F$_5$O[CF$_2$CF(CF$_3$)O]$_4$CF$_2$CF$_2$COONa
$^b$C$_2$F$_5$O[CF$_2$CF(CF$_3$)O]$_3$CF$_2$CF$_2$COONa
$^c$C$_7$F$_{15}$COONH$_4$
$^d$C$_3$F$_7$O[CF$_2$CF(CF$_3$)O]$_{4.9}$CF(CF$_3$)COONa
$^e$PVPE: CF$_2$=CFO(CF$_2$CF(CF$_3$)O)$_{5.2}$C$_3$F$_7$ in all cases

EXAMPLE 3

The copolymer of Example 1, run 149D, which contained a nitrile-substituted cure site monomer, was cured by mixing the copolymer with 0.030 g of tetraphenyltin, placing the mixture between sheets of Kapton ® polyimide film, and heating to 210° for 2 h. The resulting product was an elastic solid which could not be pressed into a new shape and which was insoluble in 2,2,4,4-tetrakis(trifluoromethyl)dithiatane, in which the original polymer was soluble. As a control, 1 g of polymer prepared in Example 1, run 69A which did not contain a cure site, was mixed with 0.030 g of tetraphenyltin and heated as described above. This sample remained soluble in the dithiatane and did not crosslink.

EXAMPLE 4

To each of two 0.1 g samples of the copolymer of Example 1, run 60B, contained in vials, was added sufficient perfluorinated polyether oil of the formula C$_3$F$_7$[OCF(CF$_3$)CF$_2$]$_n$OCF(CF$_3$)COF, wherein n is 4 to 24 and $\overline{M}_n$ is 1130, to provide mixtures corresponding to 23% oil and 50% oil, by weight. The mixtures were heated and the oil was absorbed by the polymer to form a uniform elastic solid at room temperature. To insure uniformity of the samples, each was pressed between sheets of Kapton ® polyimide film in a heated press. The film thus formed was rolled into a cylinder, folded and repressed. This was repeated five times, and the sample was reweighed to verify that no significant weight loss had occurred. The Tg of each sample was then measured by DSC. The results plotted in FIG. 2 show a regular decrease in Tg with increasing oil content.

BEST MODE FOR CARRYING OUT THE INVENTION

The best mode presently contemplated for carrying out the invention is represented by the embodiments referred to herein as "preferred", and by the examples representing these preferred embodiments.

INDUSTRIAL APPLICABILITY

The fluoroelastomers of this invention are chemically resistant and retain elastomeric properties at unusually low temperatures, making them uniquely suitable materials of construction for aerospace fuel tanks, hosing, gaskets and the like which require extreme resistance to corrosive chemicals over a wide temperature range.

Although the preferred embodiments of the invention have been illustrated and described herein, it is to be understood that there is no intent to limit the invention to the precise embodiments disclosed and it is to be further understood that the right is reserved to all changes and modifications coming within the scope of the invention as defined in the appended claims.

I claim:

1. Substantially amorphous, fluorine-containing perhalogenated copolymer having a glass transition temperature of −15° C. to −100° C. and consisting essentially of the following structural repeat units in the recited molar amounts, with the total of the amounts being 100%:

(a) about 50 to about 80% of —CF$_2$CX$^1$X$^2$— wherein each of X$^1$ and X$^2$ is independently selected from F and Cl;

(b) 5 to about 50% of

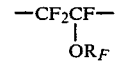

wherein R$_F$ is C$_{1-5}$ perfluoroalkyl;

(c) about 3 to about 50% of

wherein R$_F^1$ is C$_{1-12}$ perfluoroalkyl and n is an integer and is 3 to 30; and (d) 0 to about 10% of

wherein $R_F^2$ is $C_{1-12}$ perfluoroalkylene or perfluorophenylene, Q is $-CO_2R$, $-CN$, $-F$, $-Cl$, $-Br$ or I, R is $C_1-C_4$ alkyl, and m is an integer and is 1, 2 or 3;

with the proviso that (i) the total molar concentration of (b), (c) and (d) is 20 to 50%; (ii) the concentration of (c) is at least 20 weight %; and (iii) when $R_F^2$ is perfluoroalkylene, Q is $-CO_2R$, $-CN$, $-Br$ or $-I$.

2. Copolymer of claim 1 wherein the molar amounts of (b), (c) and (d) are, respectively, 5 to 35%, 5 to 35% and 2 to 5%.

3. Copolymer of claim 2 wherein n is 4 to 10.

4. Copolymer of claim 3 wherein $X^1$ and $X^2$ are $-F$ and $R_F$ is $-CF_3$.

5. Copolymer of claim 4 wherein $R_F^1$ is $-C_3F_7$.

6. Copolymer of claim 5 wherein $R_F^2$ is $-CF_2-CF_2-$, Q is $-CN$ and m is 1.

7. Copolymer of claim 5 wherein $R_F^2$ is perfluorophenylene, Q is $-F$ and m is 1.

8. Preparation of the substantially amorphous, fluorine-containing perhalogenated copolymer of claim 1 by means of an aqueous emulsion polymerization process comprising polymerizing appropriate monomers in an aqueous medium in the presence of a redox couple initiator and a surfactant at 20° C. to 90° C., the improvement consisting of polymerizing appropriate amounts of monomers of the formulas $CF_2=CX^1X^2$, $CF_2=CFOR_F$, $CF_2=CFO+CF_2CF(CF_3)O)_nR_F^1$ and $CF_2=CF_2O+CF_2CF(CF_3)O)_mR_F^2Q$ wherein $X^1$, $X^2$, $R_F$, $R_F^1$, $R_F^2$, Q, n and m are as defined in claim 1, in the presence of a fluorinated alcohol which is soluble in water and in the monomer of the formula $CF_2=CFO+CF_2CF(CF_3)O)_nR_F^1$.

9. Process of claim 8 wherein the redox couple is ammonium persulfate-sodium sulfite, the polymerization temperature is 50° C. to 70° C., the initial pH of the aqueous phase of the emulsion is at least 7, there is present a buffer, and the fluorinated alcohol is trifluoroethanol or hexafluoroisopropanol.

10. Process of claim 9 wherein the initial pH is 9 to 10.

* * * * *

UNITED STATES PATENT AND TRADEMARK OFFICE
CERTIFICATE OF CORRECTION

PATENT NO. : 4,513,128
DATED : April 23, 1985
INVENTOR(S) : Ronald E. Uschold

It is certified that error appears in the above—identified patent and that said Letters Patent is hereby corrected as shown below:

Column 4, line 20, "$\dfrac{yMy}{wMw + xMx + yMy + zMz} > 20$"

should read -- $\dfrac{yMy}{wMw + xMx + yMy + zMz} \geq 20$ --.

Signed and Sealed this

First Day of October 1985

[SEAL]

Attest:

DONALD J. QUIGG

Attesting Officer

Commissioner of Patents and Trademarks—Designate